United States Patent
Delbary et al.

(10) Patent No.: US 9,451,074 B2
(45) Date of Patent: Sep. 20, 2016

(54) METHOD OF INSTALLING A HOME-AUTOMATION SYSTEM, AND AN ASSOCIATED HOME-AUTOMATION SYSTEM

(71) Applicant: Orange, Paris (FR)

(72) Inventors: Philippe Delbary, Paris (FR); Pierre Francois Dubois, Sceaux (FR); Jean-Paul Cottet, Paris (FR)

(73) Assignee: ORANGE, Paris (FR)

( * ) Notice: Subject to any disclaimer, the term of this patent is extended or adjusted under 35 U.S.C. 154(b) by 50 days.

(21) Appl. No.: 14/365,880

(22) PCT Filed: Dec. 7, 2012

(86) PCT No.: PCT/FR2012/052845
§ 371 (c)(1),
(2) Date: Jun. 16, 2014

(87) PCT Pub. No.: WO2013/088035
PCT Pub. Date: Jun. 20, 2013

(65) Prior Publication Data
US 2014/0357254 A1    Dec. 4, 2014

(30) Foreign Application Priority Data

Dec. 15, 2011 (FR) ..................... 11 61703

(51) Int. Cl.
*H04M 1/725* (2006.01)
*G08C 17/02* (2006.01)
*H04L 12/28* (2006.01)
*H04W 4/00* (2009.01)
*H04W 8/26* (2009.01)

(52) U.S. Cl.
CPC .......... *H04M 1/72533* (2013.01); *G08C 17/02* (2013.01); *H04L 12/282* (2013.01);
(Continued)

(58) Field of Classification Search
None
See application file for complete search history.

(56) References Cited

U.S. PATENT DOCUMENTS

2005/0079863 A1* 4/2005 Macaluso ............... H04W 4/00
455/419
2007/0247134 A1* 10/2007 Ryan ..................... H02J 13/001
323/318
(Continued)

FOREIGN PATENT DOCUMENTS

| | | | |
|---|---|---|---|
| BS | EP 2107537 A1 * | 10/2009 | ....... G08B 13/19658 |
| EP | 2107537 A1 | 10/2009 | |
| FR | 2912821 A1 | 8/2008 | |

OTHER PUBLICATIONS

International Preliminary Report on Patentability and English translation of the Written Opinion dated Jun. 17, 2014 for corresponding International Application No. PCT/FR2012/052845, filed Dec. 7, 2012.

(Continued)

*Primary Examiner* — Daniel Lai
(74) *Attorney, Agent, or Firm* — David D. Brush; Westman Champlin & Koehler, P.A.

(57) ABSTRACT

A home-automation system includes a first electrical appliance and a control device incorporated in the first electrical appliance, which includes a communication device for connection to a mobile telephone network. During installation of the home-automation system, the control device performs the following steps on the electrical appliance being connected to an electrical power supply: receiving via the mobile telephone network a start control message coming from a first control terminal, the message containing a telephone number associated with the first terminal; storing the telephone number of the first control terminal; and allocating a role of administrator of the home-automation system to the first control terminal.

11 Claims, 3 Drawing Sheets

(52) U.S. Cl.
CPC ....... *H04L12/2807* (2013.01); *H04L 12/2818* (2013.01); *H04L 12/2838* (2013.01); *H04W 4/001* (2013.01); *H04W 8/26* (2013.01); *H04L 2012/2841* (2013.01)

(56) References Cited

U.S. PATENT DOCUMENTS

2008/0183307 A1\* 7/2008 Clayton ............... G05B 19/042
 700/8
2010/0097238 A1 4/2010 Dupielet et al.
2010/0222031 A1\* 9/2010 Carolan ................. G08C 17/02
 455/414.1

OTHER PUBLICATIONS

International Search Report and Written Opinion dated Feb. 6, 2013 for corresponding International Application No. PCT/FR2012/052845, filed Dec. 7, 2012.

\* cited by examiner

METHOD OF INSTALLING A HOME-AUTOMATION SYSTEM, AND AN ASSOCIATED HOME-AUTOMATION SYSTEM

CROSS-REFERENCE TO RELATED APPLICATIONS

This application is a Section 371 National Stage Application of International Application No. PCT/FR2012/052845, filed Dec. 7, 2012, which is incorporated by reference in its entirety and published as WO 2013/088035 on Jun. 20, 2013, not in English.

FIELD OF THE DISCLOSURE

The present invention relates to a method of installing a home-automation system comprising a central control device and at least one electrical appliance, e.g. an electrical outlet, connected to the control device.

BACKGROUND OF THE DISCLOSURE

Home-automation seeks to provide comfort, security, and communications solutions within a home. It requires electrical appliances (window shutters, cameras, detectors, doors, heating, etc.) to be networked and it requires an intelligent programmable control unit to be installed.

Users find that the operations of installing and programming the control unit and of networking the electrical appliances are relatively complex.

The present invention seeks to improve that situation.

SUMMARY

To this end, the invention provides a method of installing a home-automation system comprising a first electrical appliance and a control device incorporated in said first electrical appliance and provided with means for connection to a mobile telephone network, wherein the following steps are performed by the control device as a result of the electrical appliance being connected to an electrical power supply:
  receiving via the mobile telephone network a start control message coming from a first control terminal, said message containing a telephone number associated with the first terminal;
  storing the telephone number of said first control terminal; and
  allocating a role of administrator of the home-automation system to the first control terminal.

By means of the invention, once the electrical appliance has been connected to an electrical power supply, it suffices for the user to send a start message, such as an SMS message, from the user's mobile terminal in order to have that terminal registered as the administrator of the home-automation system. Since the control device is incorporated in the electrical appliance, there is no need to make a separate connection between the control device and mains. Furthermore, merely sending a start message then makes it possible to register an administrator control terminal for the home-automation system.

Advantageously, on receiving a pairing control message via the mobile telephone network, the control device puts itself into a pairing mode, establishes a communication session with a second electrical appliance, and during this session, transmits data for accessing the home-automation system to the second appliance. This access data to the home-automation system may comprise a local network identifier (corresponding to the local network of the home-automation system) together with a network security key.

In the same manner, and, by way of example, in order to pair a second outlet with the first outlet, it suffices for the user to send a pairing message.

In a particular implementation, on the control device receiving via the mobile telephone network a message for adding a second control terminal, said message containing a telephone number associated with the second terminal, the control device:
  verifies that said adding message was sent by the first terminal having the role of administrator;
  stores the telephone number of the second terminal; and
  allocates a user role to the second terminal.

The invention also provides a home-automation system comprising a first controlled electrical appliance adapted to be connected to an electrical power supply, and a control device incorporated in the first electrical appliance and provided with means for connection to a mobile telephone network, said control device comprising:
  receiver means for receiving via the mobile telephone network a start control message coming from a first control terminal, said message containing a telephone number associated with the first terminal;
  memory means for storing the telephone number of said first control terminal; and
  allocation means for allocating a role of administrator of the home-automation system to the first control terminal.

In another hardware aspect, the invention provides an electrical appliance suitable for being controlled and adapted to be connected to an electrical power supply, the appliance including a control device provided with means for connection to a mobile telephone network, said control device comprising:
  receiver means (20, 22) for receiving via the mobile telephone network a start control message coming from a first control terminal (4), said message containing a telephone number associated with the first terminal (4);
  memory means (23, 27) for storing the telephone number of said first control terminal (4); and
  allocation means (23, 27) for allocating a role of administrator of the electrical appliance to the first control terminal (4).

BRIEF DESCRIPTION OF THE DRAWINGS

The invention can be better understood with the help of the following description of a particular implementation of the method of installing a home-automation system and a particular embodiment of the home-automation system of the invention, given with reference to the accompanying drawings, in which.

DETAILED DESCRIPTION OF ILLUSTRATIVE EMBODIMENTS

Figure 1:
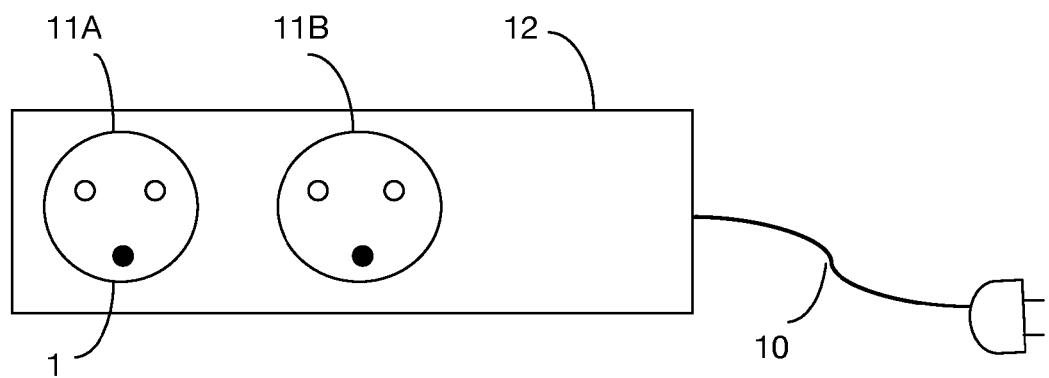
FIG. 1 is a diagrammatic view of an electrical outlet of the home-automation system, in a particular embodiment of the invention.
Figure 2A:
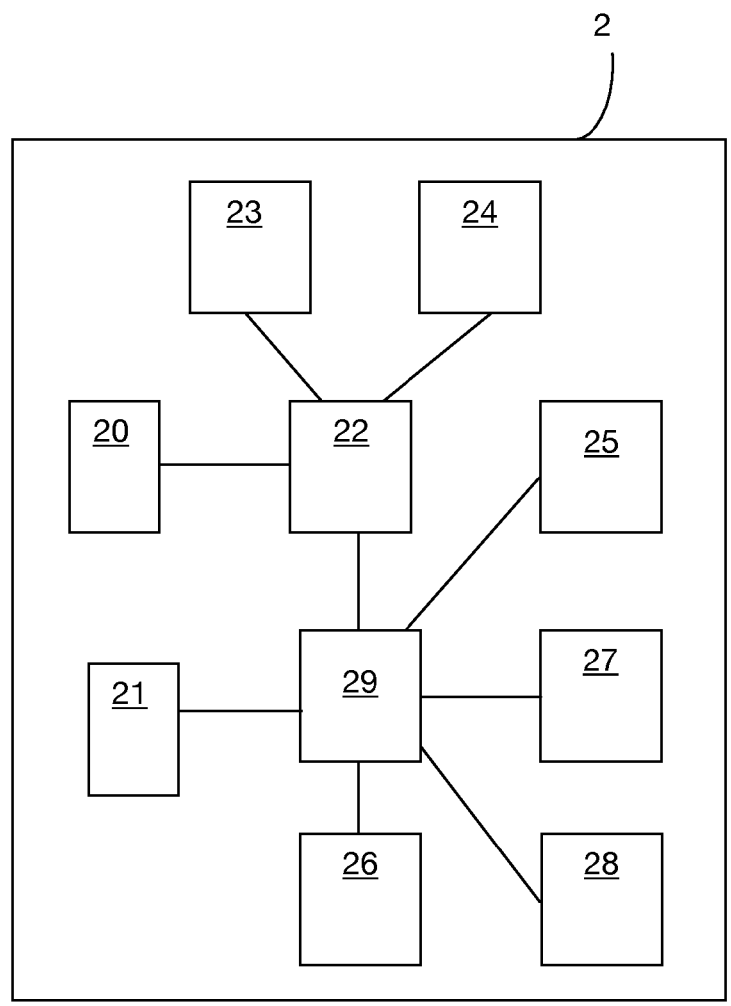
FIG. 2A is a functional block diagram of a control device incorporated in the FIG. 1 outlet, in a particular embodiment of the invention.
Figure 2B:
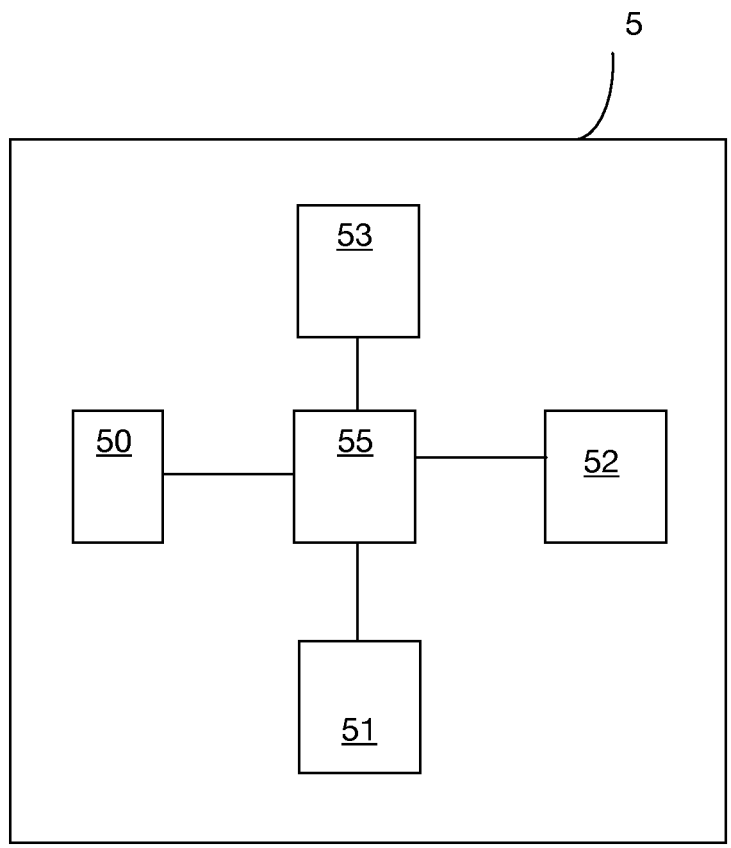
FIG. 2B is a functional block diagram of a control device incorporated in a secondary outlet, in a particular embodiment of the invention.

FIG. 1 shows a home-automation system comprising a main electrical outlet 1 and a control device 2 incorporated in the main outlet 1. In addition, the home-automation system may include one or more additional electrical outlets connected in a network with the main outlet 1 by wireless links. Networking a secondary outlet is described below in the description of the method.

From the outset it should be observed that the term "electrical outlet" is used to mean both an individual electrical outlet having only one socket, or a multi-outlet strip having a plurality of electrical outlet sockets.

In this example, the main outlet 1 is a multi-outlet strip that comprises in conventional manner a power cord 10 for connection to mains, a plurality of electrical outlets, there being two outlets 11A and 11B in this example, and a strip housing 12. The outlet 1 is associated with an identifier written ID_P1. This identifier is written on the housing 12.

The control device 2 is incorporated inside the housing 12. It comprises:
- a communications module 20 for communicating via a mobile telephone network 3, in this example a GSM network;
- a short-range wireless communications interface 21 adapted in this example to implement the ZigBee protocol;
- a transceiver module 22 for transmitting and receiving messages via the mobile telephone network 3, in this example SMS messages;
- a processor module 23 for processing messages received via the mobile telephone network 3;
- a message preparation module 24 for preparing messages for sending via the mobile telephone network 3;
- a module 25 for executing commands or programmed actions;
- a pairing module 26;
- a memory 27;
- an ON/OFF switch module 28;
- a mains-rechargeable power supply battery (not shown); and
- a control processor 29.

In addition, the outlet 1 includes an ON/OFF switch button (not shown) on the strip 12 and connected to the ON/OFF switch module in order to switch the outlet 1 on or off.

In conventional manner, the communications module 20 comprises a wireless connection interface with the mobile telephone network 3 and a subscriber SIM card for the mobile telephone network 3. The SIM card is associated with identification data in the mobile telephone network 3. This identification data includes a telephone number.

The wireless communications interface 21 enables the control device 2 to be connected via a short-range wireless link with electrical appliances, in particular electrical outlets that are provided with compatible wireless communications interfaces. Once the electrical appliance is connected, the control device 2 of the main outlet 1 can communicate via a wireless link with the electrical appliance. In this example the wireless communications interface 21 is adapted to use the ZigBee communications protocol. It is possible to envisage using some other wireless communications protocol.

The wireless communications interface 21 stores a local network identifier ID_LAN and a shared network security key K for encrypting and decrypting data exchanged between the outlet 1 and a network-connected appliance.

The module 22 is adapted to transmit and receive messages, in this example SMS messages, via the mobile telephone network 3, and to forward the SMS messages it receives to the processor module 23. When the outlet 1 is connected to mains for the first time, the module 22 is configured to transmit automatically a prerecorded SMS message to a predefined telephone number. Sending this SMS message serves to force connection to the mobile telephone network 3 as soon as the outlet 1 is connected to mains.

The processor module 23 is adapted to interpret the SMS messages received and where appropriate to order execution of commands contained in those messages. The table below lists the various types of message that may be processed by the module 23:

| Content of message | Command to be executed |
| --- | --- |
| START | start the home-automation system |
| DETECT | enter pairing mode |
| ADD [terminal telephone number to be added] | add a secondary control terminal |
| SUP [terminal telephone number to be deleted] | delete a secondary control terminal |
| ON [outlet identifier] | switch on an outlet (or multi-outlet strip) |
| OFF [outlet identifier] | switch off an outlet (or multi-outlet strip) |
| LOCK [outlet identifier] | lock an outlet in ON mode |
| UNLOCK [outlet identifier] | unlock an outlet that was previously locked in ON mode |
| MUTE | delete alerts |
| STOP MUTE | restore alerts |
| RESET | clear configuration data of the control device |

In addition, in conventional manner, each received SMS message contains the telephone number of the mobile terminal that sent the SMS message.

These various messages are described in greater detail below in the description of the method.

The module 25 is arranged to order execution of commands contained in received SMS messages or of programmed actions. These programmed actions may comprise in particular:
- metering the electricity consumption of an electric appliance connected to an electrical outlet and sending a message notifying this consumption to at least one terminal via the mobile telephone network 3;
- detecting an interruption in the electrical power supply to an outlet and sending a message notifying this interruption to at least one control terminal via the mobile telephone network 3;
- detecting restoration of electrical power supply after an interruption and sending a message notifying this restoration to at least one control terminal via the mobile telephone network 3; and
- clearing configuration data of the outlet control device.

The notification or alert messages in this example are SMS messages.

The terminal to which these notification or alert messages are sent is the main control terminal having an administrator role and having its telephone number stored in the memory 27 during a configuration step that is described below when describing the method. Notification messages may also be sent to one or more secondary control terminals having their telephone numbers stored in the memory 27.

The message preparation module 24 is arranged to create or prepare the notification or alert SMS messages that are to be sent via the mobile telephone network 3 to a control terminal having its telephone number stored in the memory 23. These alert messages may comprise in particular:

messages notifying the electricity consumption of an electrical appliance connected to an electrical outlet;
messages notifying an interruption of electrical power supply; and
messages notifying restoration of electrical power supply after an interruption, etc.

Other types of alert message may be envisaged.

The pairing module 26 is arranged to order execution of an operation for pairing the main outlet 1 with a secondary outlet. Pairing seeks to connect the secondary outlet to the main outlet 1, and more precisely to the control device 2 of the outlet 1 via a wireless link in order to network the secondary outlet with the home-automation system. Once connected, the secondary outlet can communicate by wireless links with the main outlet 1. In the particular example being described, the networked outlets use the ZigBee communications protocol.

The memory 27 is for storing configuration data which may comprise:

the telephone number of a main control terminal, this number being associated in memory with the mention "administrator" indicating that the role of administrator is allocated to this control terminal;
the telephone number(s) of one or more secondary control terminals, which number(s) is associated in memory with the mention "user", indicating that the role of user has been allocated to this control terminal;
a mention "LOCK" associated with an outlet identifier, indicating that the outlet is locked in ON mode; and
a mention "MUTE" indicating that alert or notification messages are not to be sent.

The ON/OFF switch module 28 serves to switch the outlet 1 on or off.

The power supply battery is for powering the control device 2 electrically in the event of an interruption in mains power. It recharges while the outlet is electrically powered by mains.

The control module 29 to which all of the elements of the outlet 1 are connected is arranged to control the operation of the outlet 1.

A control terminal can control various actions to be taken by the main outlet 1 or by a secondary outlet by sending SMS control messages to the outlet 1, these SMS messages being received and processed by the incorporated control device 2. The actions that a control terminal is authorized to take depend on the role or status of the terminal, which may be "administrator" or "user". In the presently-described example, an administrator terminal is authorized to control all of the actions listed in the table above, whereas a user terminal is authorized to control the following actions: switching on/off, locking/unlocking the ON mode of an outlet, and muting/restoring alerts, but it is not authorized to perform actions of adding/deleting a secondary control terminal, or of clearing configuration data. It is possible to envisage some other distribution of which actions are authorized for the administrator control terminal and for the user control terminal(s).

Figure 3:
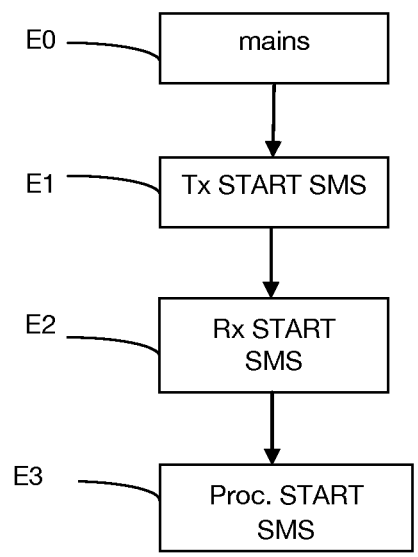
FIGS. 3 and 4 are flow charts of steps in the method of installing the home-automation system of FIG. 1 in a particular implementation of the invention.
Figure 4:
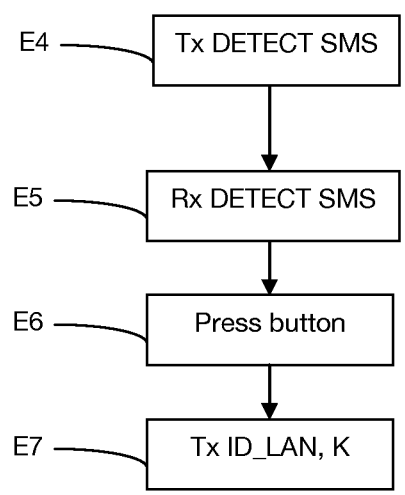

With reference to FIGS. 3 and 4, there follows a description of a particular implementation of the method of installing the above-described home-automation system.

During a step E0, a user connects the outlet 1 to mains. In this description it is assumed that this is the first connection of the outlet 1 to mains after leaving the factory.

The control device 2 is then electrically powered and switched on. On detecting that it has been switched on for the first time, it sends an SMS message via the mobile telephone network 3 to a prerecorded telephone number. To send this SMS message, the GSM communications module 20 of the device 2 must begin by making a connection to the GSM network 3. Sending the SMS message thus ensures that the outlet 1 is connected as quickly as possible to the mobile telephone network 3.

Thereafter, during a configuration step E1, the user uses a first control terminal, specifically a mobile telephone 4 via the mobile telephone network 3 to send a start SMS message to the outlet 1, the body of the message containing the mention "START". In conventional manner, the START message contains the telephone number of the mobile telephone 4 in a sender field of the message header. The message is sent to the telephone number associated with the outlet 1 (more precisely with the SIM card incorporated in the outlet 1).

During a step E2, the START message is received by the control device 2 of the outlet 1. Thereafter, the processor module 21 processes the START message during a step E3. This processing consists in activating the operation of the control device 2, in storing in the memory 27 the telephone number of the telephone 4 that sent the start message, which telephone number is present in the header of the message, and in allocating an "administrator" role to the stored mobile telephone 4. In the memory 27, the telephone number of the telephone 4 is stored in association with the mention "administrator". The "administrator" role gives the telephone 4, referred to as the main terminal, specific rights such as in particular the right to add or delete a secondary control terminal, the right to reset the control device 2, and the right to put the control device 2 into pairing mode. The administrator telephone 4 also has the same rights as are made available to a user control terminal, as explained above.

The control device 2 sends alert or notification SMS messages about the outlet 1, such as the messages described above, via the mobile telephone network 3 to the stored main terminal.

The home-automation system may also include one or more secondary outlets that are networked via wireless links with the main outlet 1 incorporating the control device 2. By way of illustration, there follows a description of the steps involved in networking a secondary outlet 5.

In this example, the secondary outlet 5 is a multi-outlet strip having a plurality of electrical outlets, e.g. two outlets. Inside its housing, the secondary outlet 5 incorporates:

a short-range communications radio interface 50, suitable in this example for performing the ZigBee communications protocol;
an ON/OFF switch module 51;
a metering module 52 for metering electricity consumption;
a memory 53; and
a control module 55.

A pairing button and a switch button (not shown) are provided on the housing of the outlet 5. The secondary outlet 5 is associated with an identifier, written ID_P2 written on the housing of the outlet 5 and stored in the memory 53. The ON/OFF switch module 51 serves to switch the outlet 5 on or off. The module 52 is arranged to measure the electricity consumption of the electrical appliance(s) connected to the outlet 5. The control module 55, to which all of the elements of the outlet 5 are connected, is arranged to monitor the operation of the outlet 5.

During a step E4, the main terminal 4 transmits a pairing SMS message containing the mention "DETECT" to the control device 2 of the outlet 1 via the mobile telephone network 3.

During a step E5, the control device 2 receives the pairing SMS message and verifies that the message was sent by the terminal 4 that has the administrator role. This verification is performed by comparing the telephone number of the sender of the SMS message (which number is present in the header of the message) with the telephone number associated in the memory 27 with the administrator terminal. If the verification is positive, the control device 2 operates in pairing (or association) mode for a predefined duration T. If the verification is negative, pairing mode is not triggered.

In pairing mode, the ZigBee radio communications interface 21 of the outlet 1 listens for radio signals coming from equipment to be paired. During a step E6, within the duration T, the user presses on the pairing button 51 of the secondary outlet 5. During a step E7, a point-to-point session becomes established between the control device 2 and the secondary device 5, and during this session, the control device 2 sends data for accessing the local network of the home-automation system to the secondary outlet 5, which data includes in this example the network identifier ID_LAN and the shared network security K. The identifier ID_LAN and the key K are stored in the memory 53. During pairing, the control device 2 receives the identifier ID_P2 of the outlet 5 and stores it in its memory 27. The control device 2 can then send alert SMS messages such as those described above and concerning the secondary outlet 5 to the control terminal 4.

Once associated with the main outlet 1, the secondary outlet 5 regularly sends wireless frames by wireless link to the control device 2 of the main outlet 1 in order to indicate that it is present. If the control device 2 detects that no wireless frame has been received from the secondary outlet 5 during a period longer than a predefined maximum duration, it sends an alert to the control terminal 4 indicating an interruption of electrical power supply to the outlet 5.

On request of the control device 2, the secondary outlet 5 sends information to the control device 2 about the consumption of the electrical appliance(s) connected to the outlet 5. The control device 2 can thus send consumption tracking alerts to the terminal 4 via the mobile telephone network 3.

There follows a description of the operations performed on receiving other messages listed above in the table (ADD, SUP, ON, OFF, LOCK, UNLOCK, MUTE, STOP MUTE, RESET).

ADD and SUP

To add a secondary control terminal, the administrator control terminal 4 sends an SMS message via the mobile telephone network 3 to the telephone number associated with the main outlet 1, which message contains the mention ADD followed by the telephone number of the secondary control terminal that is to be added. On receiving the ADD message, the control device 2 of the outlet 1:

verifies that the ADD message was sent by the control terminal 4 having the role of administrator;
if the verification is positive, stores in its memory 27 the telephone number of the secondary terminal for adding as specified in the message; and
allocates a user role to the secondary terminal.

In order to delete a secondary control terminal, the main control terminal (or administrator) 4 sends an SMS message via the mobile telephone network 3 to the telephone number associated with the main outlet 1, which message contains the mention SUP followed by the telephone number of the secondary control terminal that is to be deleted. On receiving the SUP message, the control device 2 of the outlet 1:

verifies that the SUP message was sent by the terminal 4 having the administrator role; and
deletes from its memory 27 the telephone number of the secondary terminal that is to be deleted as specified in the message.

ON and OFF

For the purpose of switching an outlet on or off remotely from a control terminal (the main terminal 4 or a secondary terminal), the control terminal sends an SMS message via the mobile telephone network 3 to the telephone number associated with the main outlet 1, which message contains the respective mention ON or OFF together with the identifier (in this example ID_P1 or ID_P2) of the outlet concerned. The control device 2 receives this message, interprets it, and then transmits a command to the switch module of the identified outlet to switch the outlet to ON mode (if it is to be switched on) or OFF mode (if it is to be switched off) depending on the mention contained in the message.

LOCK and UNLOCK

In order to lock an outlet in ON mode, from a control terminal (the main terminal 4 or a secondary terminal), the control terminal sends an SMS message via the mobile telephone network 3 to the telephone number associated with the main outlet 1, which message contains the mention LOCK and the identifier (ID_P1 or ID_P2) of the outlet concerned. The control device 2 receives this message, interprets it, and then transmits a command to the switch module of the outlet having its identifier present in the message, for causing the outlet to be blocked in ON mode. The switch button of the outlet is then no longer operational, i.e. it is inactive.

In order to unlock an outlet that has previously been locked in ON mode, a main or secondary control terminal 4 sends an SMS message via the mobile telephone network 3 to the telephone number associated with the main outlet 1, which message contains the mention UNLOCK and the identifier (ID_P1 or ID_P2) of the outlet in question that is to be unlocked. The control device 2 receives this message, interprets it, and then transmits a command to the switch module of the identified outlet to cause the outlet to be unlocked (the switch button of the outlet becomes operational once again).

MUTE and STOP MUTE

In order to stop alert messages relating to a "target" outlet (which may be the main outlet 1 or a secondary outlet 5), a main or secondary control terminal sends an SMS message via the mobile telephone network 3 to the telephone number associated with the main outlet 1, which message contains the mention MUTE and the identifier (ID_P1 or ID_P2) of the target outlet. The control device 2 receives this message, interprets it, and then sends the mention MUTE together with the identifier of the target outlet to the module 25 so as to inform the module 25 that it must no longer send alert messages about that outlet.

In order to cause alert messages relating to the outlet previously put into MUTE mode to be sent once more, a main or secondary control terminal sends an SMS message via the mobile telephone network 3 to the telephone number associated with the main outlet 1, which message contains the mention STOP MUTE and the identifier (ID_P1 or ID_P2) of the target outlet. The control device 2 receives this message, interprets it, and then transmits the mention STOP MUTE together with the identifier of the target outlet to the module 25 so as to notify the module 25 that it is to send alert messages relating to that outlet once more.

RESET

The control terminal 4 having the administrator role can cause the control device 2 to be reset by sending an SMS message containing the mention RESET via the mobile telephone network 3 to the telephone number associated with the main outlet 1. The RESET operation consists in clearing all of the recordings, parameter settings, and configurations that have been performed since the main outlet 1 left the factory.

In the above description, the home-automation system comprises one or more electrical outlets. In more general manner, the home-automation system may comprise a first electrical appliance incorporating the control device and optionally one or more second electrical appliances adapted to connect with the control device incorporated in the first electrical appliance. Connecting the first electrical appliance to an electrical power supply serves also to supply electrical power to the incorporated control device.

Although the present disclosure has been described with reference to one or more examples, workers skilled in the art will recognize that changes may be made in form and detail without departing from the scope of the disclosure and/or the appended claims.

The invention claimed is:

1. A method of installing a home-automation system comprising a first electrical appliance and a control device incorporated in said first electrical appliance and provided with a communications device for connection to a mobile telephone network, wherein the following acts are performed by the control device as a result of the electrical appliance being connected to an electrical power supply said connection being the first one of the electrical appliance after leaving a factory:
   receiving via the mobile telephone network a start control message coming from a first control terminal, said message when interpreted, ordering execution of a start command of the home automation system and containing a telephone number associated with the first control terminal;
   processing the received message, said processing comprising:
   activating operation of the control device;
   storing the received telephone number of said first control terminal as an administrator; and
   allocating a role of administrator of the home-automation system to the first control terminal.

2. The method according to claim 1, wherein, on receiving a pairing control message via the mobile telephone network, the control device puts itself into a pairing mode, establishes a communication session with a second electrical appliance, and during this session, transmits data for accessing the home-automation system to the second appliance.

3. The method according to claim 1, wherein, on the control device receiving via the mobile telephone network a message for adding a second control terminal, said message containing a telephone number associated with the second control terminal, the control device:
   verifies that said adding message was sent by the first control terminal having the role of administrator;
   stores the telephone number of the second control terminal; and
   allocates a user role to the second control terminal.

4. A method according to claim 1, wherein, on first connection of the home-automation system to an electrical power supply, the control device automatically sends a message via the mobile telephone network in order to make a connection with said mobile network.

5. A method according to claim 1, wherein the control message is an SMS message.

6. A method according to claim 1, wherein the first electrical appliance is an electrical outlet.

7. A home-automation system comprising:
   a first controlled electrical appliance configured to be connected to an electrical power supply, and
   a control device incorporated in the first electrical appliance and provided with a communications device for connection to a mobile telephone network, said control device comprising:
   receiver means for receiving via the mobile telephone network a start control message coming from a first control terminal as a result of a first connection of the first controlled electrical appliance to the power supply after leaving a factory, said message when interpreted, ordering execution of a start command of the home automation system and containing a telephone number associated with the first control terminal;
   a non-transitory computer-readable medium; and
   processing means for:
   processing the received message;
   activating operation of the control device;
   storing the received telephone number of said first control terminal as an administrator in the non-transitory computer-readable medium; and
   allocating a role of administrator of the home-automation system to the first control terminal.

8. The home-automation system according to claim 7, wherein the control device includes pairing means arranged, on receiving a pairing control message via the mobile telephone network, to put itself into a pairing mode, to establish a communication session with a second electrical appliance, and during this session, to transmit data for accessing the home-automation system to the second electrical appliance.

9. A home-automation system according to claim 7, wherein the control device includes means adapted, on receiving via the mobile telephone network a message for adding a second control terminal, said message containing a telephone number associated with the second control terminal:
   to verify that said adding message was sent by the first control terminal having the role of administrator;
   to store the telephone number of the second control terminal; and
   to allocate a user role to the second control terminal.

10. A system according to claim 7, wherein the first electrical appliance is an electrical outlet.

11. An electrical appliance suitable for being controlled and configured to be connected to an electrical power supply, the appliance comprising:
    a control device provided with a communications device configured for connection to a mobile telephone network, said control device comprising:
    receiver means for receiving via the mobile telephone network a start control message coming from a first control terminal as a result of a first connection of the electrical appliance to the power supply after leaving a factory, said message when interpreted, ordering execution of a start command of the home automation system and containing a telephone number associated with the first control terminal;
a non-transitory computer-readable medium; and
processing means for:
 processing the received message;
 activating operation of the control device;
 storing the received telephone number of said first control terminal as an administrator in the non-transitory computer-readable medium; and
 allocating a role of administrator of the electrical appliance to the first control terminal.

* * * * *